(12) United States Patent
Horton, Jr.

(10) Patent No.: US 11,306,693 B2
(45) Date of Patent: Apr. 19, 2022

(54) MULTIPLE-CHOICE PIGGYBACK IGNITION BOOSTER CIRCUIT FOR INTERNAL COMBUSTION ENGINES AND OTHER MOTORS

(71) Applicant: Fenton Horton, Jr., Glen Burnie, MD (US)

(72) Inventor: Fenton Horton, Jr., Glen Burnie, MD (US)

(73) Assignee: INERTIA PERFORMANCE LLC, Glen Burnie, MD (US)

( * ) Notice: Subject to any disclaimer, the term of this patent is extended or adjusted under 35 U.S.C. 154(b) by 0 days.

(21) Appl. No.: 16/949,334

(22) Filed: Oct. 26, 2020

(65) Prior Publication Data

US 2021/0040929 A1    Feb. 11, 2021

Related U.S. Application Data

(63) Continuation-in-part of application No. 16/288,537, filed on Feb. 28, 2019, now abandoned.

(51) Int. Cl.
*F02P 3/04* (2006.01)
*B60Q 9/00* (2006.01)

(52) U.S. Cl.
CPC .............. *F02P 3/0407* (2013.01); *B60Q 9/00* (2013.01)

(58) Field of Classification Search
CPC .. F02P 3/0435; F02P 3/05; F02P 3/051; F02P 3/0808; F02P 3/0807; F02P 9/002; F02P 15/12
See application file for complete search history.

(56) References Cited

U.S. PATENT DOCUMENTS

| | | | | |
|---|---|---|---|---|
| 3,443,556 A | * | 5/1969 | Vadala | F02P 3/0838 123/630 |
| 2011/0303201 A1 | * | 12/2011 | Romano | F02P 3/05 123/620 |
| 2014/0375067 A1 | * | 12/2014 | Yang | H02J 1/108 290/38 R |
| 2016/0343546 A1 | * | 11/2016 | Kishinevsky | H01J 37/3405 |
| 2018/0122163 A1 | * | 5/2018 | Galula | G07C 5/008 |

* cited by examiner

*Primary Examiner* — Sizo B Vilakazi
*Assistant Examiner* — Anthony L Bacon
(74) *Attorney, Agent, or Firm* — Dunlap Bennett & Ludwig, PLLC

(57) ABSTRACT

A booster circuit for use with an ignition system for an internal combustion engine is provided. The booster circuit includes a relay control circuitry disposed in parallel between the voltage source and the one or more ignition coils for igniting fuel in the engine in synchronism with engine operation; a controllable switching element for selectively completing a booster circuit for connecting the relay control circuitry in series with the voltage source and the one or more ignition coils; and the booster circuit having electronic circuitry including at least one output for providing booster energy at the at least one output, when the booster circuit is completed by the controllable switching element to assure producing of a suitable voltage applied to the one or more ignition coils.

3 Claims, 5 Drawing Sheets

MULTIPLE-CHOICE PIGGYBACK IGNITION BOOSTER CIRCUIT FOR INTERNAL COMBUSTION ENGINES AND OTHER MOTORS

CROSS-REFERENCE TO RELATED APPLICATION

This application claims the benefit of priority of U.S. Non-provisional application Ser. No. 16/288,537, filed 28 Feb. 2019, the contents of which are herein incorporated by reference.

BACKGROUND OF THE INVENTION

The present invention relates to ignition circuits for internal combustion engines and, more particularly, to a multi-choice piggyback ignition booster circuit for motors.

Booster circuits for ignition systems are required to provide additional power for better performance; for instance, to compensate for unsatisfactory performance of the ignition system during starting. Current booster circuits, however, also have the following drawbacks: they are electronically complex, they are bulky in size, they do not have a built-in backup or default bypass system and they have limited vehicular compatibility—i.e., they do not fit on all vehicles, for example, possibly working on foreign but not domestic vehicles.

As can be seen, there is a need for a piggyback ignition booster that has near universal vehicular compatibility—compatible with foreign and domestic, old and new vehicles—that incorporates a built-in bypass or default system, wherein the operator has the option to manually turn it on and off.

The piggyback ignition booster embodied in the present invention provides additional power for better performance in terms of torque and efficiency, on demand. The device can perform as an addition to the stock ignition system or through a manually operable on/off switch so that the piggyback ignition booster of the present invention is smaller than current solutions and is capable of being used on any gasoline powered motor.

Today's gasoline ignition systems need huge amounts of current. This applies to the acceleration, torque, and gas consumption. Often under demand many vehicle's ignition systems are unable to provide it. As a result, many ignition systems are only operating at 60-70% of "full capacity".

The constant velocity ignitor (CVI) embodied in the present invention is designed to store enough electrical current, then release that energy extremely fast, due to its unique design and low internal resistance in such a way that when an operatively associated vehicle's ignition system demands a new surge of current the CVI circuit will provide it.

BRIEF DESCRIPTION OF THE DRAWINGS

FIG. 4 shows an improvement to the wiring from a vehicle's fuse box 50 to the vehicle's ignition coils 90, showing the improved portion itself, disconnected from the old structure. In certain embodiment, the piggyback ignition booster is "ON" when the toggle or switch is up and "OFF" when down; much like operating your home's lights, a vehicle's power windows or power locks. After the vehicle is running, its operator will turn the (CVI) toggle or switch "ON or OFF" by hand. This option may only be available if a CVI switch is installed on (or within) the vehicle's dashboard—on the driver's side. The device may include a ½ inch toggle (the top marked "ON" and the bottom marked "OFF").

The function of the diodes 60 may be to allow the electric current to pass (within the capacitors 75) in one direction, while blocking it in the opposite direction. Enabling the energy to only flow in one direction (with the capacitors) to the positive side of the ignition coil(s) 90. The other function of the diodes 60 may be to increase the output current to the ignition coil(s) 90, while decreasing the input DC-voltages. This action causes the output voltage (to the coils) to increase the output current to the positive side of the ignition coil(s) 90.

Figure 8:
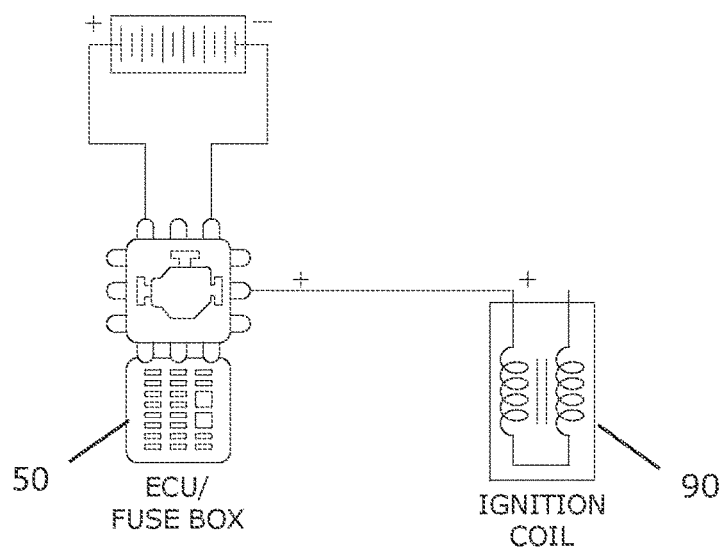

FIG. 8. is a schematic view of stock wiring from a vehicle's fuse box to the vehicle's ignition coils prior to installation of the present invention. It should be noted that FIG. 8 shows the old structure of the prior art by itself, and FIGS. 9-11 show the combination of the old structure and the present invention.

Figure 9:
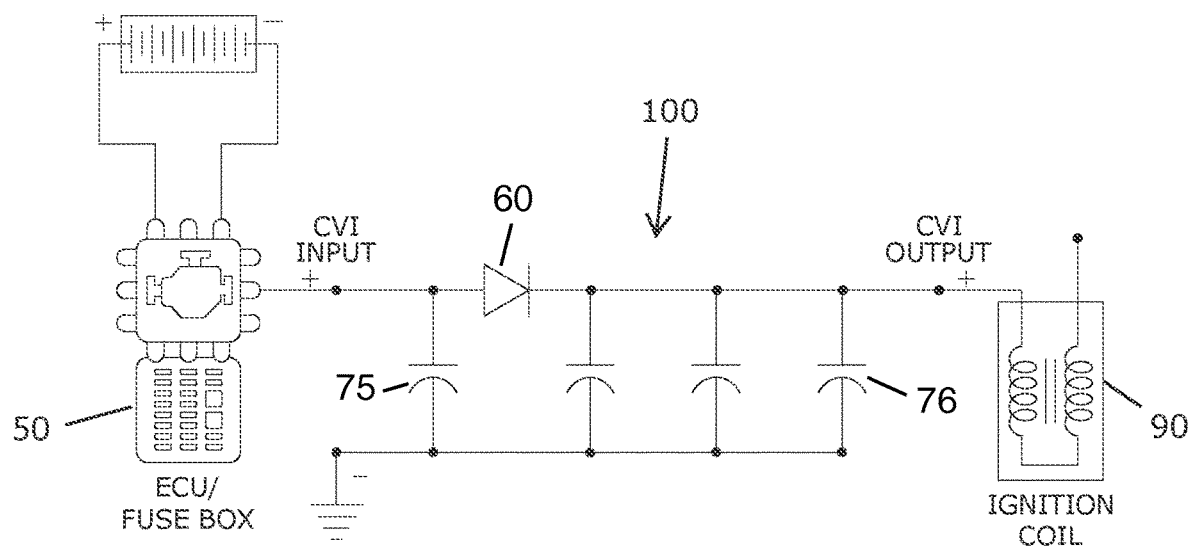
Figure 11:
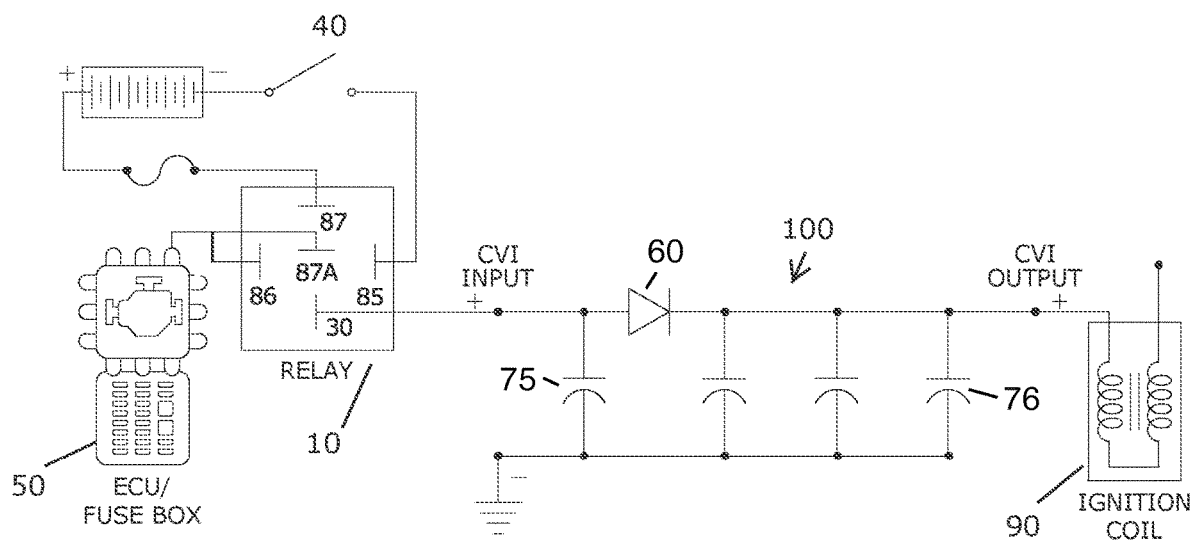

FIG. 9. is a schematic view of an exemplary embodiment of the present invention illustrating how the CVI circuit 100 would connect to a vehicle with a single ignition coil, wherein the ignition coil is connected to the positive side of the CVI circuit 100, thereby demonstrating how the CVI circuit 100 would be used on a motorcycle or smaller car, and as a result such vehicles are not in need of a "heavy" relay illustrated in FIG. 11.

Figure 10:
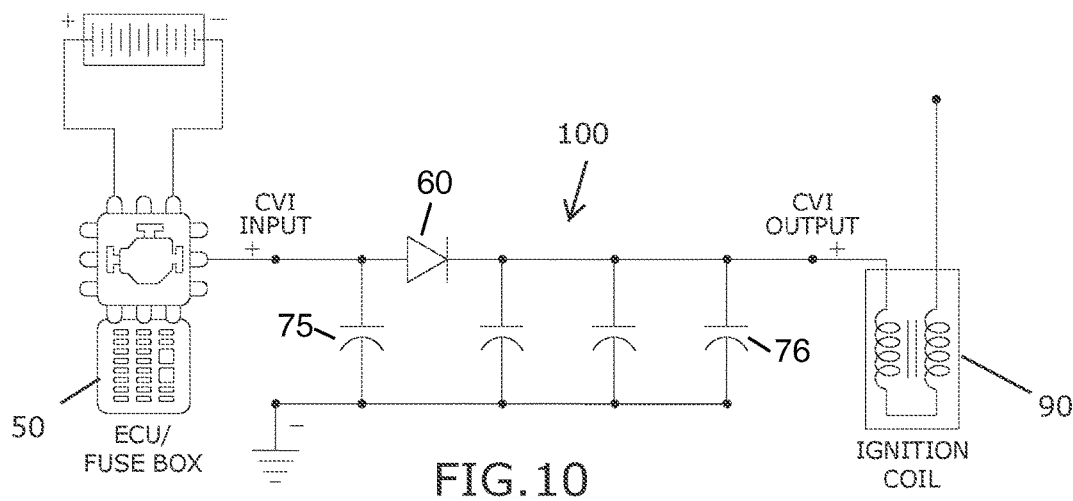

FIG. 10. is a schematic view of an exemplary embodiment of the present invention demonstrating how the CVI circuit 100 would connect to a vehicle with a multiple ignition coil vehicle, such as a 4-cylinder, 6-cylinder, 8-cylinder, etc., wherein the ignition coil is connected to the positive side of the CVI circuit 100. The CVI circuit 100 ground is directly connected to the vehicle's factory ground or the battery's negative post (only) and thus not connected to the fuse box 50.

FIG. 11. is a schematic view of an exemplary embodiment of the present invention, illustrating the relay at the beginning of the CVI circuit, thereby heavier vehicles (e.g., RVs or a bus) that, in certain embodiments, draws 12-volts (positive) directly from the power source/battery, wherein the ignition coil is connected to the positive side of the CVI. The 87A is directly connected to 86 of the relay and not the fuse box 50.

Figure 5:
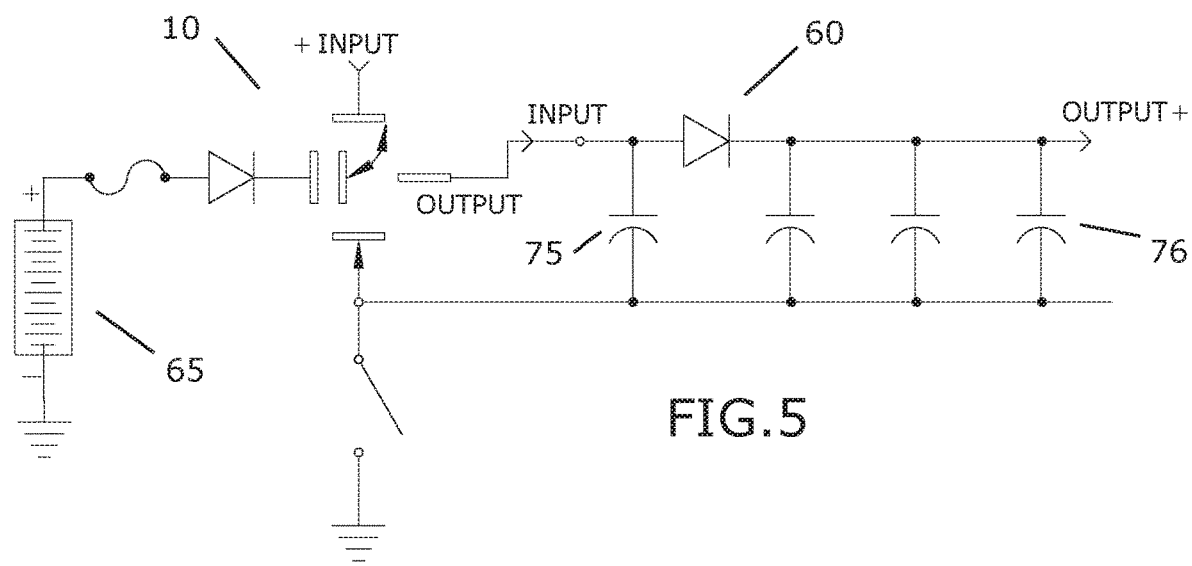
FIG. 5 is a schematic view of an exemplary embodiment of the present invention adapted for heavier vehicles (e.g., RVs or a bus). In this configuration, the relay 10 at the beginning of the CVI circuit 100 of FIG. 3 draws 12-volts directly from the power source/battery 65, and achieves greater performance through the embodying two diodes 60 in the circuit.

The bypass shown in both FIG. 11 and FIG. 5 may be the same except for one difference. The only difference or exception is within FIG. 11 which displays 86 and 87A are connected separately (or independently) to the ECU/Fuse Box. Note: Normally, 86 may be connected to 87A outside the Relay. Also, 86 and 87A should be connected (from the Relay) together to the same Input source (i.e. the ECU/Fuse Box).

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, the present invention may include a booster circuit for use with an ignition system for an internal combustion engine is provided. The booster circuit includes a relay control circuitry disposed in parallel between the voltage source and the one or more ignition coils for igniting fuel in the engine in synchronism with engine operation; a controllable switching element for selectively completing a booster circuit for connecting the relay control circuitry in series with the voltage source and the one or more ignition coils; and the booster circuit having electronic circuitry including at least one output for providing booster energy at the at least one output, when the booster circuit is completed by the controllable switching element to assure producing of a suitable voltage applied to the one or more ignition coils.

Referring to FIGS. 1 through 7, the present invention may include a relay control circuitry 10 selectively coupling an input circuitry 20 and a bypass circuitry 30 with output. The relay control circuitry 10 may include capacitors 75, diodes 60, transistors, resistors along with one or more switching elements 40 as indicated on the schematics.

The power source/battery 65 may be connected to the fuse box 50 by an electrical connection, such as a 14-gauge wire. Vehicular voltage may be applied by the battery 65 through the fuse (provided by the input circuitry 20) to a first capacitor 75 coupled to a diode connecting to a set of second capacitors 76 connected to the normally open side of the relay control circuitry 10. The normally closed side of the relay control circuitry 10, which requires no power may be connected via the original power to the ignition coils (provided by the output circuitry 80). A single line from the relay control circuitry 10 may be connected to the ignition coils 90. The relay control circuitry 10 may be powered by the original source to the ignition coils. The switching element 40 may be an on/off switch that is put in series with the relay control circuitry 10 and the normal power source to the ignition along the same wire of the negative side of the relay control circuitry 10 providing ground.

A method of manufacturing the present invention is illustrated in FIGS. 3 through 7 and may include the following. A manufacturer may utilize PC board to attach the electronic components including the diode to the positive side of the first capacitor. That line may then be connected to the normally open side of the relay control circuitry 10, while the positive wire coming from the fuse to the diode, wherein the opposite side of the diode is now connected to the capacitors, and wherein the line from the capacitors is now connected to the normally open side of the relay control circuitry 10. The original power wire for the ignition coils is now connected to the normally closed side of the relay control circuitry 10. The positive side of the relays coil may be connected to a switch element 40 in series to the original power source to the coil. The negative side of the capacitors may be connected in series to the resistor. The resistor may be connected to ground. The negative side of the relay coil may be connected to ground. The output 30 from the relay 10 is now connected to the ignition coils 90. This output 30 illustrated in FIG. 11 provides the booster energy.

To use the present invention, a user would install the present invention disclosed above to a gasoline powered vehicle and hook it up to the coils (output circuitry 80) and battery 65. Currently this device should only be used in conjunction with the ignition system. Additionally, the device does have future potential applications for example "fuel injectors".

How circuit provides booster energy at the output:

The capacitors 75 and 76 of the CVI circuit 100 stored energy from the vehicles normal power supply 65.

The CVI circuit 100 input wiring installs in-line with the existing positive side of the ignition coil(s) 90 wiring and "boosts" the input current of the CVI.

How the relay and switching element are controlled:

The relay 10 and switching element 40 are controlled by the vehicle's existing wiring that connect to the ignition coil(s) 90.

How controls/signals are provided to the elements:

The conditions required to activate the switch for boosting the output is to simply start the operatively associated vehicle.

Most of the above answer is on page 1 (A & B").

The second part of the question's answer:

The CVI (device) is normally "ON" immediately after a vehicle started.

Method of using the present invention

A stock ignition system, as illustrated in FIG. 8, does not handle high RPM's well. This is because the stock ignition coil(s) 90 do not have time necessary to fully recharge before the next discharge due to the short time between ignition firings.

Now, under heavy-load and high RPMs the CVI (unit) enhances the secondary voltage by discharging an increased stored energy load to the (positive-side) of the ignition coil(s) 90, thereby supplying the vehicle with immediate additional torque and acceleration throughout the vehicle's, entire RPM range.

The CVI may be used to enhance the existing positive side of the ignition coil(s) 90. The ignition coil 90 may be a "step-up" transformer. It raises the primary battery voltage (about 12-volts) to a higher secondary voltage. The ignition coil(s) 90 put out a secondary voltage as high as 20,000 to 25,000 volts on conventional ignition, and up to 35,000 and higher volts on high-energy ignitions.

Figure 1:
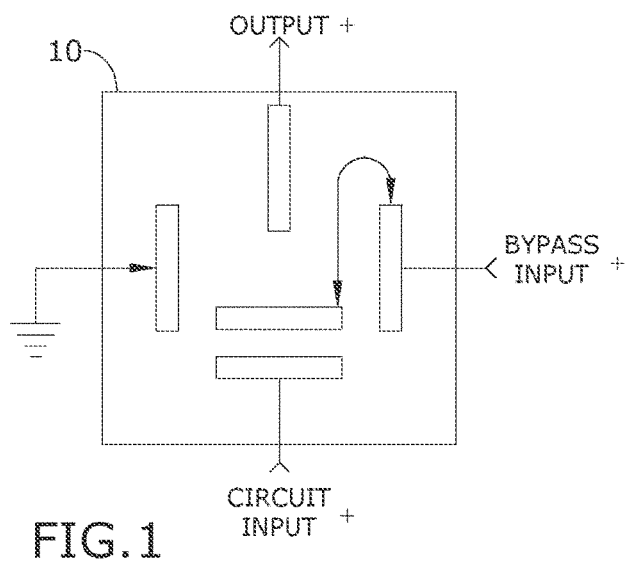
FIG. 1 is a schematic view of an exemplary embodiment of a relay control circuitry 10 of the present invention, shown disconnected from the old structure. Note, that FIGS. 2-7 also show the present invention disconnected from the old structure.
Figure 2:
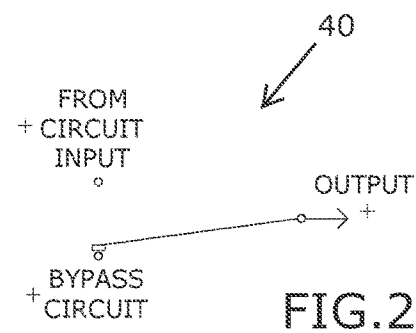
FIG. 2 is a schematic view of an exemplary embodiment of a switching element 40 of the present invention.
Figure 3:
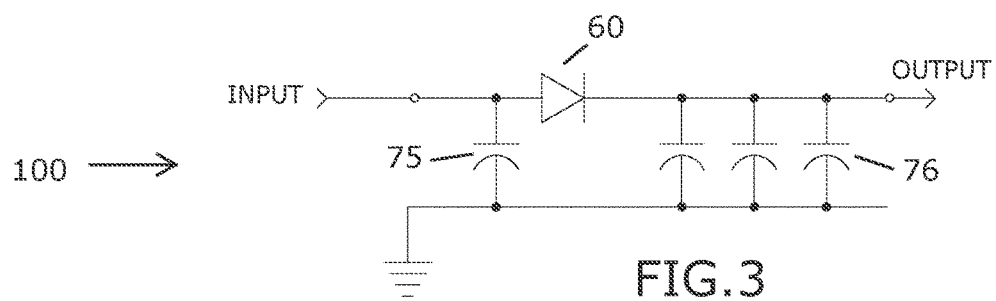
FIG. 3 is a schematic view of an exemplary embodiment of A constant velocity ignitor (CVI) circuitry 100 of the present invention, an improvement to the electrical connection from a vehicle's fuse box to the vehicle's ignition coils 90, showing the improved portion itself, disconnected from the old structure.
Figure 4:
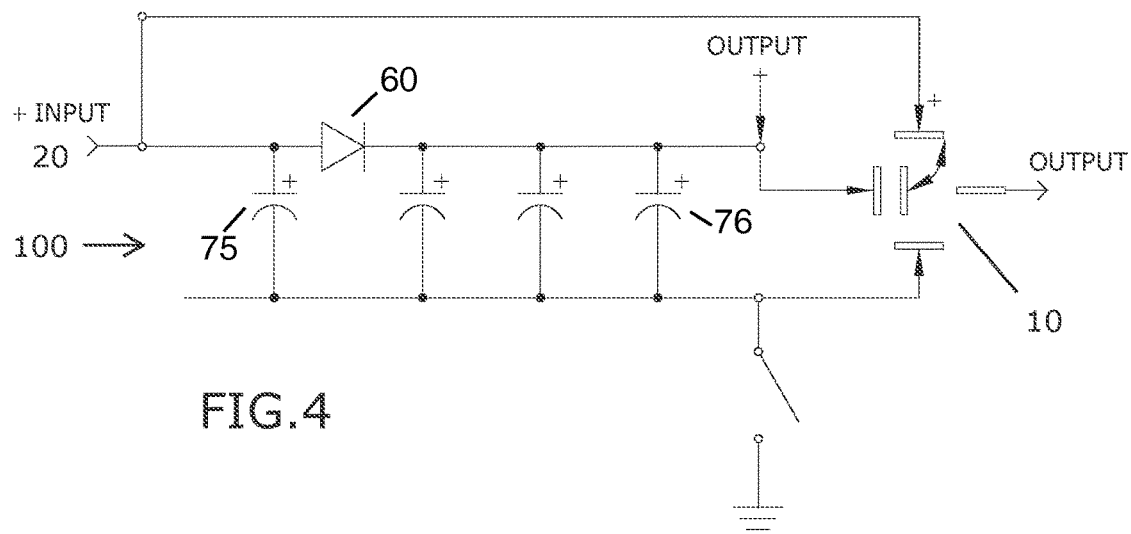
FIG. 4 is a schematic view of an exemplary embodiment of the present invention, illustrating the output of the CVI circuitry 100 connected to the relay 10, enables the present invention to switch between an on-state and an off-state ("on/off bypass circuit" configuration), wherein the on-state provides the booster energy, and the off-state returns the vehicle to its "stock" configuration illustrated in FIG. 8. In other words.
Figure 6:
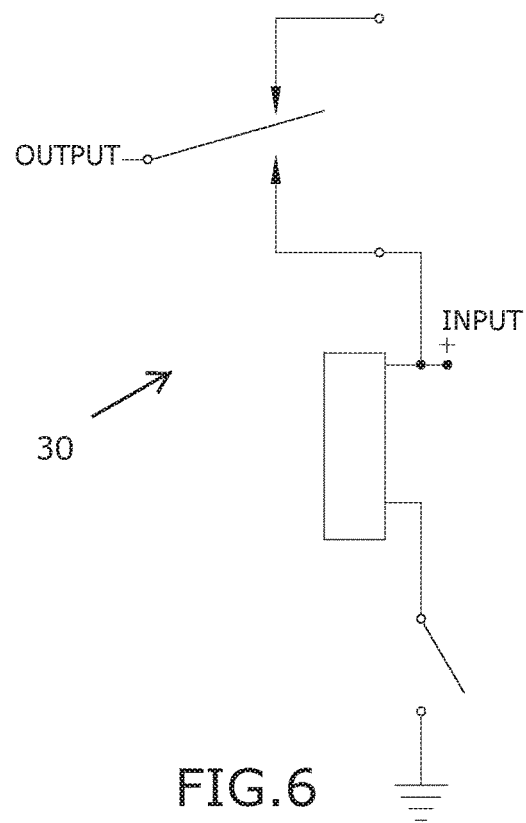
FIG. 6 is a schematic view of an exemplary embodiment of a bypass circuitry 30 and relay is basically the same as FIG. 5 but showing the working of the internal relay of the present invention.
Figure 7:
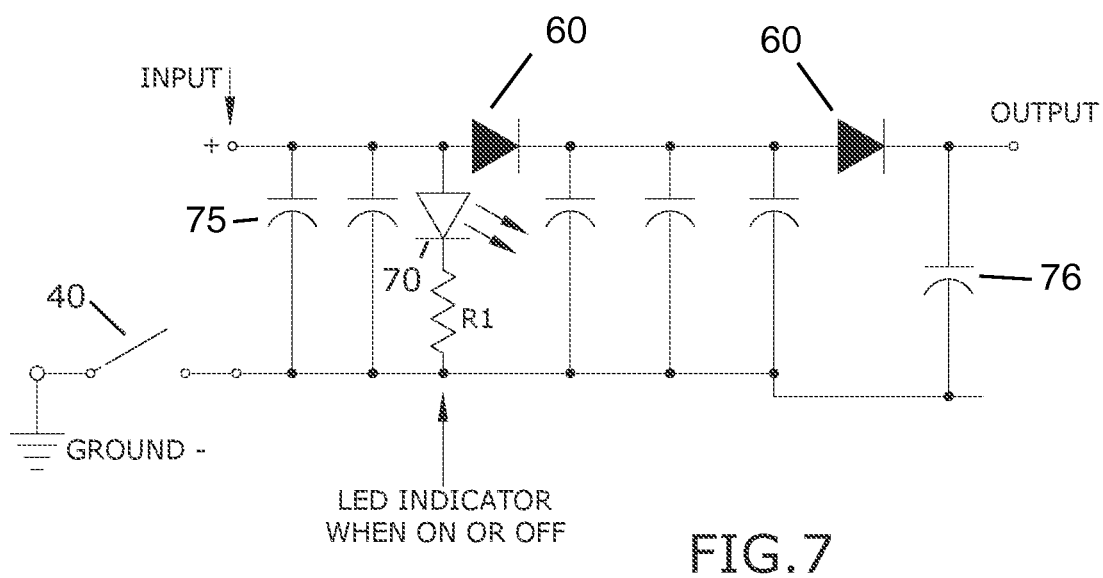
FIG. 7 is a schematic view of FIG. 4 with an LED indicator 70, no relay connected to the output, and two diodes 60. Both diodes 60 may be on the positive side of the input and output. And additional diode 60 is to further reduce the (positive-side) output voltage, while increasing the output's (positive-side current to the ignition coil(s) 90. The LED indicator 70 may indicate whether the device is in the on-state or the off-state. The (12 volt) toggle switch 40 controls the negative side of CVI circuit 100. The switch 40 also prevents the capacitor(s) 75 and the LED indicator 70 from being charged.

How the circuit is operated to complete a booster energy to produce a suitable voltage FIG. 6 illustrates the inner workings of the relay. The fully assembled CVI circuit is illustrated in FIG. 4. Please note that there are two different circuits working in series within the CVI.

A first circuit is the relay 10, wherein terminal 86 is the positive side to energize the relay 10, while terminal 85 is the negative side of the connection for the relay 10.

A second circuit is the main components within the CVI circuitry 100. The CVI circuitry 100 is in parallel when terminal 85 directly connected to the negative side factory ground—i.e., when it is activated or turned on. Therefore, when terminal 85 is not connected to the negative side factory ground via switch 40, the relay 10 and the capacitors cannot energize. The CVI circuitry 100 becomes in series when the original positive side source (i.e., the wiring from the ignition fuse, which is housed within the fuse box to the ignition coil(s) 90) connects externally to terminal 86 and terminal 87A.

To complete the circuit in series terminal 87A is (internally) connected to terminal 30. Terminal 30 is connected to the ignition coil(s) 90.

The suitable voltage range is between 11-16 volts. This voltage comes from the vehicle's battery and alternator.

The CVI enhances the vehicles RPM but does not alter or enhance the parameters (e.g., the type of fuel, combustion mode, engine crank angle position or timing.

The relay 10 diverts energy from the original source (i.e., the ignition fuse that is housed within the fuse box that was feeding the ignition coil(s) 90. By installing a single pole switch (on-state/off-state) in-line with the negative side of the relay 10, a user can change the vehicle's mode from stock to enhanced and back again.

It should be understood, of course, that the foregoing relates to exemplary embodiments of the invention and that modifications may be made without departing from the spirit and scope of the invention as set forth in the following claims.

What is claimed is:

1. A booster circuit for use with an ignition system for an internal combustion engine, the ignition system including a voltage source and one or more ignition coils, comprising:
   a relay control circuitry disposed between the voltage source and the one or more ignition coils;
   a controllable switching element for selectively engaging the relay control circuitry in series with the voltage source and the one or more ignition coils;
   the booster circuit having electronic circuitry including an output for providing booster energy at the at least one output, when the relay control circuitry in series; and
   said electronic circuitry including a diode interposed in parallel with the a first capacitor and a plurality of second capacitors connected to an open side of the relay control circuitry, configured to provide an on/off circuit.

2. The booster circuitry of claim 1, further comprising the first capacitor coupled to the diode connecting upstream to the set of second capacitors.

3. The booster circuitry of claim 1, further comprising an LED indicator.

* * * * *